United States Patent
Chongoushian et al.

(10) Patent No.: US 10,699,586 B2
(45) Date of Patent: Jun. 30, 2020

(54) LINK 16 DATALINK FOR INTEGRATED COLLISION AVOIDANCE SYSTEM

(71) Applicant: BAE Systems Information and Electronic Systems Integration Inc., Nashua, NH (US)

(72) Inventors: John H Chongoushian, Emerson, NJ (US); James W Lang, Wayne, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 102 days.

(21) Appl. No.: 16/166,870

(22) Filed: Oct. 22, 2018

(65) Prior Publication Data
US 2020/0126435 A1    Apr. 23, 2020

(51) Int. Cl.
*G08G 5/04* (2006.01)
*G08G 5/00* (2006.01)
(Continued)

(52) U.S. Cl.
CPC .......... *G08G 5/045* (2013.01); *G08G 5/0008* (2013.01); *H04W 4/021* (2013.01); *H04W 4/46* (2018.02); *H04W 76/14* (2018.02)

(58) Field of Classification Search
CPC ........ G08G 5/04; G08G 5/045; G08G 5/0008; H04W 76/14
See application file for complete search history.

(56) References Cited

U.S. PATENT DOCUMENTS

| | | | |
|---|---|---|---|
| 6,262,679 B1* | 7/2001 | Tran | G01S 13/933 342/29 |
| 7,308,005 B1* | 12/2007 | Roggendorf | H04L 12/66 370/326 |

(Continued)

FOREIGN PATENT DOCUMENTS

WO    2017135998 A1    8/2017

OTHER PUBLICATIONS

Temizer, S., et al. "Collision Avoidance for Unmanned Aircraft Using Markov Decision Processes." AIAA Guidance, Navigation, and Control Conference. Aug. 5, 2010. Entire Document. US.

(Continued)

*Primary Examiner* — Dale Moyer
(74) *Attorney, Agent, or Firm* — Maine Cernota & Rardin; Scott J. Asmus

(57) ABSTRACT

An auto-ICAS compliant system and method of avoiding collisions between aircraft linked by a Link 16 network comprises establishing an ICAS datalink between aircraft less than 10 nautical miles apart. Datalink messages generated and processed by ICAS datalink modules are transmitted and received by Link 16 receivers rather than dedicated ICAS transceivers. The datalink messages are embedded within the propagation delay portions of Link 16 timeslots and exchanged among up to 10 nearby aircraft at a data rate of up to 20 Hz each. Because each Link 16 timeslot can contain a Link 16 message and two 768-bit ICAS datalink messages, conventional Link 16 communication is not impeded. Datalink messages can be software encrypted. Link 16 messages can be encoded using an enhanced throughput Link 16 protocol that includes fewer preamble pulses and/or eliminates STN information. Embedded datalink messages can be transmitted at 1 Watt by a MIDS-JTRS CMN4.

21 Claims, 6 Drawing Sheets

(51) Int. Cl.
  *H04W 4/021*  (2018.01)
  *H04W 76/14*  (2018.01)
  *H04W 4/46*   (2018.01)

(56)　　　　　　References Cited

U.S. PATENT DOCUMENTS

| | | |
|---|---|---|
| 2003/0233192 A1 | 12/2003 | Bayh et al. |
| 2005/0055143 A1 | 3/2005 | Doane |
| 2007/0222665 A1 | 9/2007 | Koeneman |
| 2010/0292871 A1 | 11/2010 | Schultz et al. |
| 2013/0343226 A1* | 12/2013 | Holmes .............. H04B 7/18506 370/254 |
| 2016/0262151 A1 | 9/2016 | Chongoushian et al. |

OTHER PUBLICATIONS

International Search Report, PCT/US2019/056177, 9 pages, dated Jan. 9, 2020.

* cited by examiner

LINK 16 DATALINK FOR INTEGRATED COLLISION AVOIDANCE SYSTEM

FIELD

The disclosure relates to collision avoidance systems, and more particularly to collision avoidance systems applicable to aircraft in combat environments.

BACKGROUND

When piloting an aircraft, avoidance of collisions is always of significant concern. Even pilots of private and commercial flights are taught to be highly vigilant with regard to both terrestrial hazards, such as mountains and broadcast towers, as well as airborne hazards such as other commercial and private aircraft, hot air balloons, etc. In addition to pilot vigilance, air traffic control specialists and highly sophisticated radar-aware software systems monitor and communicate with aircraft when they are located in high traffic areas, so as to provide further protection against collisions.

Of course, the problem of collision avoidance is much more severe in air combat situations, where aircraft speeds are much greater, aircraft typically fly in closely-spaced groups, and it is sometimes necessary for individual aircraft to make rapid, unplanned maneuvers, for example when avoiding hostile ground or air fire and/or when pursuing hostile aircraft. Under such circumstances, strong demands are placed on a pilot's attention and concentration, such that even highly skilled and trained pilots run the risk of colliding with terrestrial hazards or with other, friendly aircraft.

Various approaches have been proposed and/or implemented with regard to automatically detecting and avoiding potential collisions of aircraft with terrestrial and/or airborne hazards. These typically include an aircraft scanning the environment using RADAR or a similar method, and attempting to determine directions and relative distances to potential hazards. While this approach can be effective for avoiding hazards that are somewhat distant, which is typically the case for terrestrial threats and hostile air threats, this approach can be insufficient for avoiding collisions with friendly aircraft, which may be located very nearby, typically closer than 10 nautical miles (Nm).

One approach to avoiding collisions between friendly aircraft is to equip each of the aircraft with a special transponder, such that the aircraft can exchange location, speed, and direction information with each other. Examples include the civilian "Traffic collision avoidance system" (TCAS), and the military "Airborne collision avoidance system" (ACAS). Of course, for use in combat environments the transponder communications must be highly resistant to jamming, spoofing, and other hostile interference.

More recently, the United States Air Force has begun testing the Auto-ICAS (Automatic Integrated Collision Avoidance System), which combines RADAR-based capabilities with exchange of messages between friendly aircraft so as to avoid both friendly and hostile air collisions as well as collisions with terrestrial hazards. With regard to avoidance of collisions between friendly aircraft, the Auto-ICAS specification requires that the system must include a datalink that enables message exchanges of 768 bits each at a rate of 20 Hz between up to 10 aircraft that are located within a 10 Nm range of each other.

While real time exchange of location, speed, direction, and other relevant information can be effective in avoiding collisions between friendly aircraft flying within 10 Nm of each other, the implementations that have been proposed all require that participating aircraft be equipped with special transponders that are dedicated to the collision avoidance system, which leads to a significant increase in "space, weight, power, and cost" (SWaP-C).

What is needed, therefore, is a system and method of avoiding collisions between friendly aircraft in a combat situation that meets the Auto-ICAS specification while minimizing consumption of space, weight, power, and cost.

SUMMARY

The present disclosure is a system and method of avoiding collisions between friendly military aircraft that meets the Auto-ICAS specification of providing a datalink that enables message exchange rates of 768 bits per link at a rate of at least 20 Hz between up to 10 aircraft that are within a 10 Nm range of each other, while minimizing consumption of space, weight, power, and cost. The collision avoidance datalink is referred to herein as an "ICAS" datalink. However, one of skill in the art will realize that the present disclosure is not limited only to the US government ICAS program, and that embodiments may deviate from some of the requirements of the US ICAS specification.

Specifically, the present disclosure takes advantage of the fact that virtually all United States military aircraft, and many military aircraft of NATO and other US allies, intercommunicate with each other using Link 16 compliant communication systems. Rather than requiring that each participating aircraft be equipped with a separate ICAS transponder that is dedicated to a collision avoidance datalink, the present disclosure uses existing Link 16 hardware as the transceiver hardware for the ICAS datalink. More specifically, the present disclosure capitalizes on the fact that there is almost no propagation delay between aircraft that are within 10 Nm of each other, and on that basis uses the approximately 2 msec. propagation delay period that is provided at the end of each Link 16 timeslot for transmitting ICAS data without interfering with conventional Link 16 communication.

Link 16 is a widespread tactical wireless networking system that is used by frontline land, air, and naval systems in the United States, NATO, and other allied nations to allow multiple users to share situational awareness data. Among other advantages, Link 16 includes "secure data unit" (SDU) features that comprise both transmission security measures (physical security measures such as pseudo-random frequency hopping) and communications security measures (such as encrypting of messages), and is thereby highly resistant to jamming, spoofing, and other hostile interference.

Information is transmitted on a Link 16 network in time division multiple access (TDMA) timeslots that repeat every frame, or "epoch." Each of the timeslots is about 7.8 msec. in duration. However, because Link 16 is required to provide interconnection over a range of 300 Nm, data transmission is limited to only about 5.8 msec in each timeslot, while the remaining approximately 2 msec. of each timeslot remains free of data so as to allow for propagation delays.

Each Link 16 participant terminal (node) is initialized with a unique identifier, known as the Source Track Number (STN), along with an SDU identification number (SDU-ID) and time slot assignments that indicate which time slots are to be used for transmitting and receiving by that node. Time slots can also be assigned for relaying of information by designated relay nodes in the network. In addition to general communications, the nodes in a Link 16 network continuously exchange Precise Participant Location and Identification (PPLI) messages. During normal Link 16 communication, nodes identify themselves to each other by including both STN information and SDU-ID in the data that is transmitted during the timeslots.

The present disclosure provides an enhancement of the Link 16 protocol that enables existing Link 16 hardware to meet the transponder requirements of the Auto-ICAS collision avoidance datalink specification, without degrading the ability of the Link 16 systems to perform their Link 16 communication duties. Embodiments include a dedicated collision avoidance module, also referred to herein generically as an "ICAS" datalink module, which is in data communication with the Link 16 hardware, and which generates and processes the collision avoidance "ICAS" datalink messages that are transmitted and received by the Link 16 hardware using the modified Link 16 protocol. In some embodiments, the collision avoidance datalink module is distinct from the Link 16 radio system, which for example can be a MIDS-JTRS CMN4, while in other embodiments the collision datalink module is incorporated into the Link 16 radio system. In embodiments, the ICAS messages are each 768 bits long, and in some of these embodiments the messages include software level encryption.

Unlike Link 16, the ICAS communication datalink requirement applies only to aircraft that are located within 10 Nm of each other. For aircraft that are located within 10 Nm of each other, the propagation delay is vanishingly small, such that the Link 16 timeslot propagation delay serves no purpose. The present disclosure takes advantage of this fact, and makes use of the otherwise empty propagation delays to contain the ICAS messages that are exchanged between nearby aircraft over the ICAS datalink, while allowing the preceding 5.8 msec. of the timeslot to be used for conventional Link 16 communication.

As such, the collision avoidance data link of the present disclosure is synchronized with the timeslots of the Link 16 network. In embodiments, the frequency hopping and/or data encoding of the collision avoidance messages is/are also identical to or coordinated with the frequency hopping and/or data modulation scheme that is implemented in the Link 16 network. However, it should be noted that embodiments incorporate frequency hopping patterns and/or data modulation schemes that deviate from, and can be largely unrelated to, the frequency hopping and data modulation scheme(s) that is/are implemented in the Link 16 network.

In embodiments, at least two 768-bit messages can be exchanged within each 2 msec. propagation delay of each link 16 timeslot. Since the Link 16 timeslots are each about 7.8 msec. in length, this provides a total ICAS message rate of about 256 Hz, which satisfies the ICAS datalink specified requirement of exchanging messages with up to 10 nodes at a rate of 20 Hz per node, i.e. at total message rate of 200 Hz.

In embodiments, as some aircraft draw nearer together while others diverge from each other, the nodes of the Link 16 network collaborate so as to dynamically assign transmission opportunities to the nodes, so as to allow them to join and withdraw from the collision avoidance data link(s), thereby enhancing collision avoidance. In some of these embodiments, these reassignments are implemented as an enhancement of the Link 16 timeslot reallocation functionality.

A first general aspect of the present disclosure is a method of avoiding collisions between a protected aircraft and surrounding aircraft. The method includes providing on the protected aircraft and on each of the surrounding aircraft a Link 16 transceiver and a collision avoidance datalink module in data communication with the Link 16 transceiver, using the Link 16 transceivers to establish a Link 16 network that enables the protected aircraft to exchange Link 16 messages with all of the surrounding aircraft, the Link 16 messages being transmitted in Link 16 timeslots, determining by the protected aircraft of positions of the surrounding aircraft relative to the protected aircraft, designating as nearby aircraft all of the surrounding aircraft that are located within ten nautical miles of the protected aircraft, establishing a collision avoidance datalink between the protected aircraft and at least one of the nearby aircraft, exchanging datalink messages over the collision avoidance datalink, the datalink messages being generated and processed by the collision avoidance datalink modules, and being transmitted and received by the Link 16 transceivers, and detecting and avoiding potential collision threats at least partly based on the exchanged datalink messages.

The Link 16 transceivers transmit and receive the datalink messages by transmitting the datalink messages during propagation delay portions of the Link 16 timeslots that would otherwise be reserved for propagation delays of the Link 16 messages transmitted during the Link 16 timeslots, such that each Link 16 timeslot that contains a datalink message embedded in the propagation delay portion thereof is also able to contain a Link 16 message.

In embodiments, the protected aircraft determines the positions of the surrounding aircraft at least partly based on PPLI information received from the surrounding aircraft over the Link 16 network.

In any of the above embodiments, the collision avoidance datalink can be able to include at least ten nearby aircraft.

Any of the above embodiments can be able to embed at least two datalink messages within the propagation delay portion of the Link 16 timeslots.

In any of the above embodiments, the Link 16 transceivers can be able to exchange embedded datalink messages at a rate of at least 200 Hz, thereby enabling the protected aircraft to exchange datalink messages with ten nearby aircraft over the collision avoidance datalink at a rate of 20 Hz per nearby aircraft.

In any of the above embodiments, the datalink messages can each be at least 768 bits in length.

In any of the above embodiments, Link 16 timeslots in which the datalink messages are embedded can be transmitted by the Link 16 transceivers at a power level of no more than 1 Watt.

Any of the above embodiments can further include prioritizing by the Link 16 transceiver of the protected aircraft of the nearby aircraft at least partly according to the relative distances of the nearby aircraft from the protected aircraft. In some of these embodiments, n the prioritizing of the nearby aircraft is further according to estimated rates at which the nearby aircraft are closing in position with the protected aircraft. And in any of these embodiments, if there are more than ten nearby aircraft, the collision avoidance datalink can be established between the protected aircraft and those ten of the nearby aircraft having highest priorities.

Any of the above embodiments can further include the protected aircraft and the surrounding aircraft collaborating via the Link 16 network so as to assign data link message transmission opportunities to the surrounding aircraft, thereby enabling the surrounding aircraft to join and withdraw from the collision avoidance data link as their positions change with time.

Any of the above embodiments can further include, for Link 16 timeslots containing both a Link 16 message and a datalink message, encoding the Link 16 message using a modified, enhanced throughput Link 16 protocol that includes fewer preamble pulses than are included in Link 16 messages transmitted in timeslots that do not include a datalink message. In some of these embodiments, Source Track Number ("STN") information can be excluded from the Link 16 messages that are encoded using the enhanced throughput Link 16 protocol.

In any of the above embodiments, the datalink messages can include software level encryption.

Any of the above embodiments can further include transmitting additional datalink messages in Link 16 timeslots that do not include Link 16 messages, but instead are filled with datalink messages, thereby increasing a rate of datalink message exchange over the collision avoidance datalink. In some of these embodiments, each of the Link 16 timeslots that are filled with datalink messages is able to contain at least seven datalink messages.

A second general aspect of the present disclosure is a collision avoidance system that enables a protected aircraft to avoid collisions with surrounding aircraft, wherein each of the surrounding aircraft is carrying and operating compatible apparatus. The system includes a Link 16 transceiver and a collision avoidance datalink module in data communication with the Link 16 transceiver. The Link 16 transceiver is able to exchange Link 16 messages with the surrounding aircraft, thereby establishing a Link 16 network with all of the surrounding aircraft, the Link 16 messages being contained in Link 16 timeslots. The Link 16 transceiver is able to determine positions of the surrounding aircraft relative to the protected aircraft based on the exchanged Link 16 messages, whereby all surrounding aircraft that are located within ten nautical miles of the protected aircraft are designated as nearby aircraft. The link 16 transceiver and ICAS datalink are able to establish a collision avoidance datalink that includes the protected aircraft and at least one of the nearby aircraft, whereby the protected aircraft is able to exchange datalink messages with the at least one nearby aircraft over the collision avoidance datalink, the datalink messages being generated and processed by the collision avoidance datalink module and being transmitted and received by the Link 16 transceiver. And the collision avoidance datalink module is able to detect and avoid potential collision threats, at least partly based on the exchanged datalink messages. The Link 16 transceiver is able to transmit and receive the datalink messages during propagation delay portions of the Link 16 timeslots that would otherwise be reserved for propagation delays of the Link 16 messages contained within the Link 16 timeslots, such that each Link 16 timeslot that contains a datalink message embedded in the propagation delay portion thereof is also able to contain a Link 16 message.

In embodiments, at least two 768 bit datalink messages can be embedded within the propagation delay portion of the Link 16 timeslots.

In any of the above embodiments, the Link 16 transceiver can include a one Watt transmitter that is able to transmit the datalink messages to the nearby aircraft.

In any of the above embodiments, the Link 16 transceiver can be further configured to prioritize the nearby aircraft according to their relative distances from the protected aircraft and their estimated closing rates with the protected aircraft, and if there are more than ten nearby aircraft, establish the datalink between the protected aircraft and those ten of the nearby aircraft having highest priorities.

And In any of the above embodiments, the Link 16 transceiver can be configured to encode Link 16 messages that are transmitted during timeslots that also include a datalink message using a modified, enhanced throughput Link 16 protocol that includes fewer preamble pulses than are included in conventional Link 16 messages, and does not include Source Track Number ("STN") information.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a system and method of avoiding collisions between friendly military aircraft that meets the Auto-ICAS specification of providing a datalink that enables message exchange rates of 768 bits per link at a rate of at least 20 Hz between up to 10 aircraft that are within a 10 Nm range of each other, while minimizing consumption of space, weight, power, and cost. The collision avoidance datalink is referred to herein as an "ICAS" datalink. However, one of skill in the art will realize that the present disclosure is not limited only to the US government ICAS program, and that embodiments may deviate from some of the requirements of the US ICAS specification.

Specifically, the present disclosure takes advantage of the fact that virtually all United States military aircraft, and many military aircraft of NATO and other US allies, intercommunicate with each other using Link 16 compliant communication systems. Rather than requiring that each participating aircraft be equipped with a separate ICAS transponder that is dedicated to a collision avoidance datalink, the present disclosure uses existing Link 16 hardware as the transceiver hardware for the ICAS datalink.

Link 16 is a widespread tactical wireless networking system that is used by frontline land, air, and naval systems in the United States, NATO, and other allied nations to allow multiple users to share situational awareness data. Among other advantages, Link 16 includes "secure data unit" (SDU) features that comprise both transmission security measures (physical security measures such as pseudo-random frequency hopping) and communications security measures (such as encrypting of messages), and is thereby highly resistant to jamming, spoofing, and other hostile interference.

Information is transmitted on a Link 16 network in time division multiple access (TDMA) timeslots that repeat every frame, or "epoch." The total number of timeslots included in a Link 16 network can be divided into subsets that represent virtual subnetworks, also referred to as "subnets." Each subnet is distinguished according to the subset of the Link 16 time slots that belongs to the subnet, as well as by the participants that share the subset of time slots. Link 16 subnets are also differentiated by their frequency-hopping patterns. Multiple subnets in a network can be "stacked" or "multi-netted" by allowing time slots to be used redundantly, with the data transmitted in each net on different frequencies (FDMA) and possibly also with different coding (CDMA).

Figure 1:
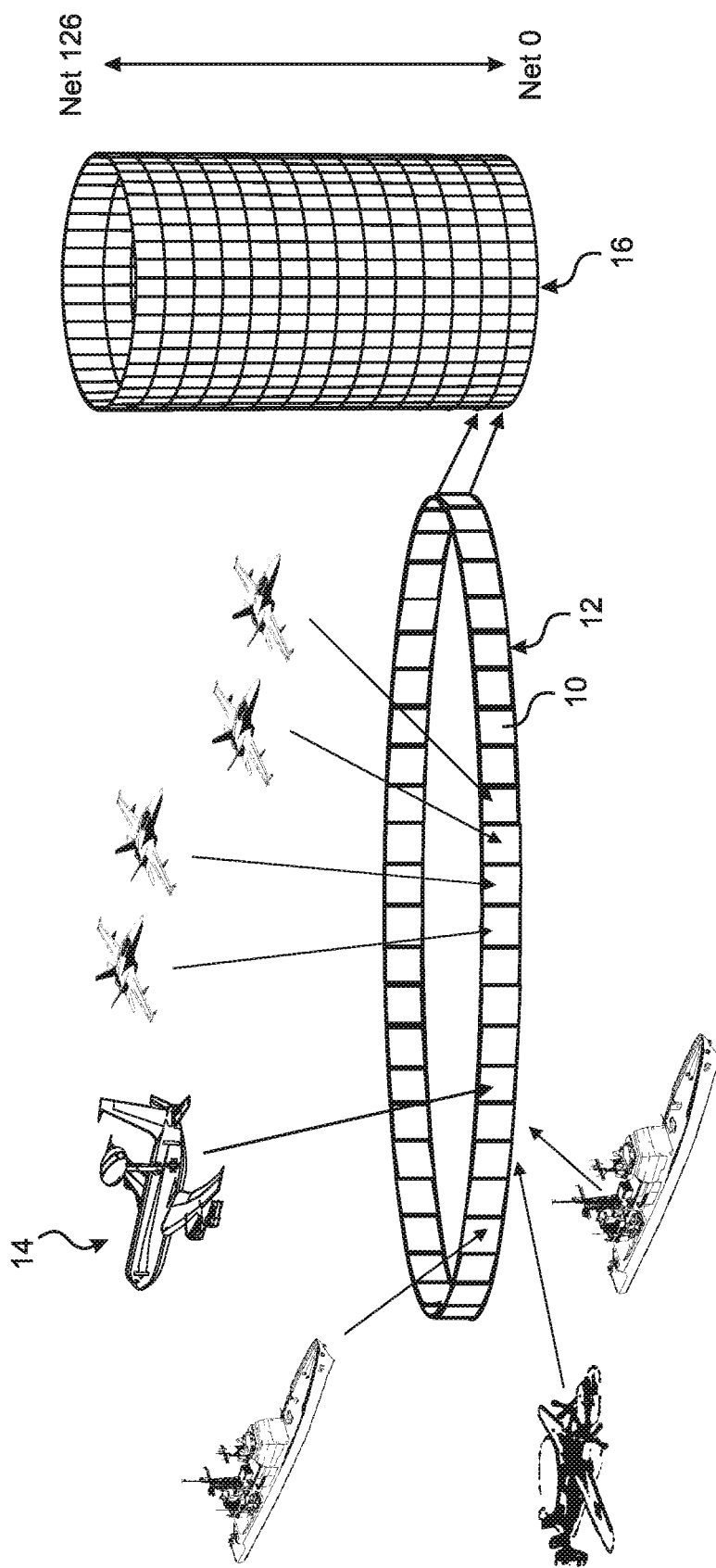
FIG. 1 is a graphical illustration of a typical Link 16 channel architecture of the prior art.

A typical link 16 network is shown in FIG. 1. The blocks 10 in the ring 12 are time slots. Each participant 14 is provided transmit and receive time slot assignments by a network planner (not shown) prior to start of a mission. The column 16 to the right of the ring 12 illustrates the ability for Link 16 to operate on multiple nets (shown as stacked rings in the column 16), allowing users to form sub-networks or sub-nets that operate in parallel using frequency division multiple access (FDMA), and in some instances also code division multiple access (CDMA).

Each Link 16 participant terminal (node) is initialized with a unique identifier, known as the Source Track Number (STN), along with an SDU identification number (SDU-ID) and time slot assignments that indicate which time slots are to be used for transmitting and receiving by that node. Time slots can also be assigned for relaying of information by designated relay nodes in the network. In addition to general communications, the nodes in a Link 16 network continuously exchange Precise Participant Location and Identification (PPLI) messages. Details of the construction of the PPLI messages can be found in MIL-STD-6016. During normal Link 16 communication, nodes identify themselves to each other by including both STN information and SDU-ID in the data that is transmitted during the timeslots.

Figure 2:
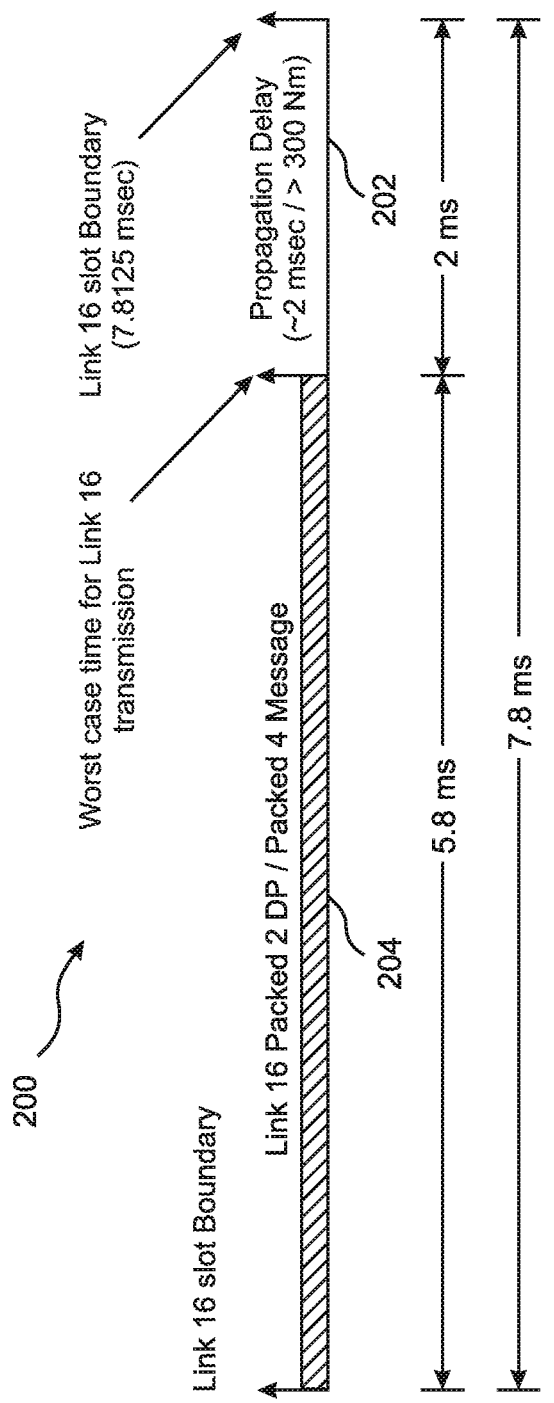
FIG. 2 is a graphical illustration of a Link 16 timeslot of the prior art.

With reference to FIG. 2, each link 16 time slot 200 has a duration of 1 second divided by 128, i.e. approximately 7.8 msec. (7.8125 msec., to be precise). However, due to speed-of-light propagation delays over the full 300 Nm range of a Link 16 network, it is necessary to include a propagation delay 202 at the end of each time slot 200 that lasts approximately 2 msec. Accordingly, the data that is transmitted within a Link 16 time slot 200 is restricted to an initial period of only about 5.8 msec. 204 within the timeslot 200. No information is transmitted within the final period 202 of approximately 2 msec.

Figure 3:
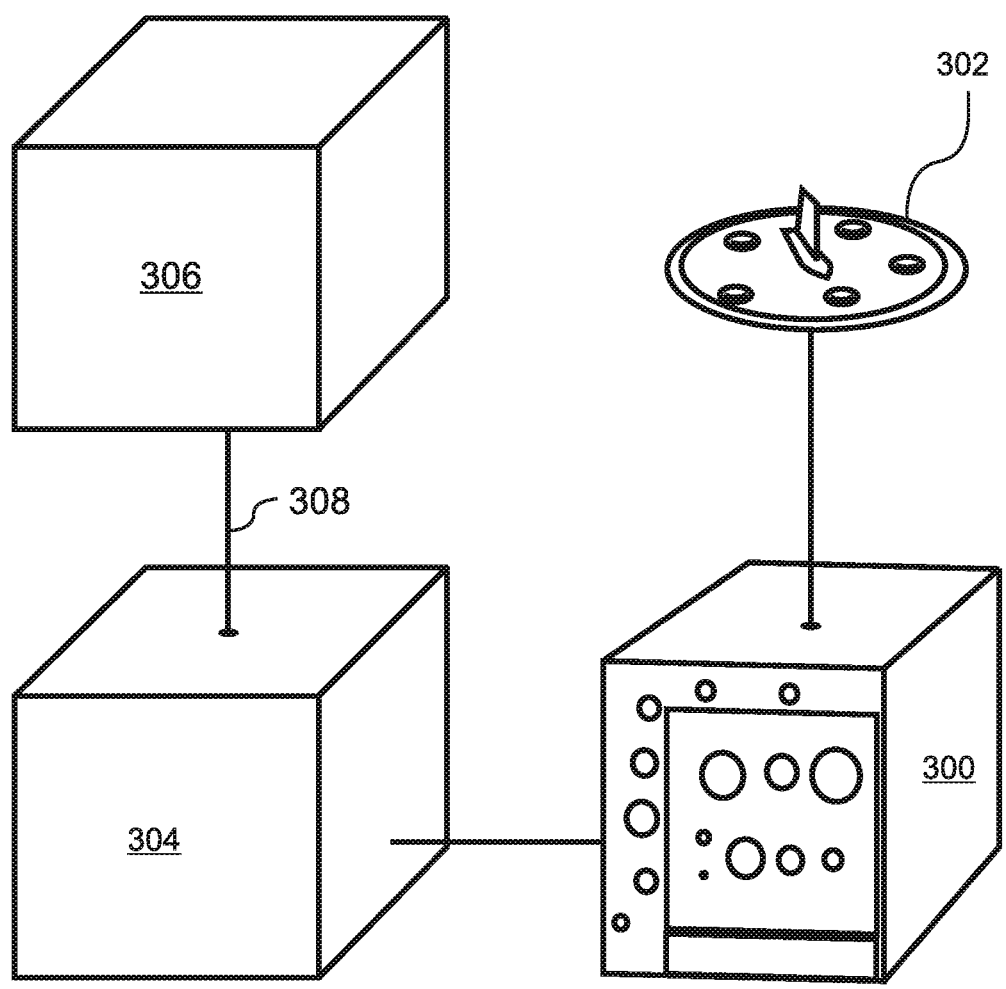
FIG. 3 is a simplified block diagram of the Link 16 transceiver, ICAS datalink module, and aircraft control computer according to an embodiment of the present disclosure.

With reference to FIG. 3, the present disclosure provides an enhancement of the Link 16 protocol that enables existing Link 16 hardware 300 to meet the transponder requirements 302 of the Auto-ICAS collision avoidance datalink specification, without degrading the ability of the Link 16 systems to perform their normal communication duties. Embodiments include a dedicated collision avoidance module 304, also referred to herein generically as an "ICAS" datalink 304 module, which is in data communication with the Link 16 hardware 300, and which generates and processes the ICAS datalink messages that are transmitted and received by the Link 16 hardware 300 using the modified Link 16 protocol. In some embodiments, the collision datalink module 304 is distinct from the Link 16 radio system 300, which for example can be a 4-channel "Multifunction Information Distribution System Joint Tactical Radio System Concurrent Multi-netting terminal" (MIDS-JTRS CMN4), while in other embodiments the collision datalink module 304 is incorporated into the Link 16 radio system 300.

Figure 4:
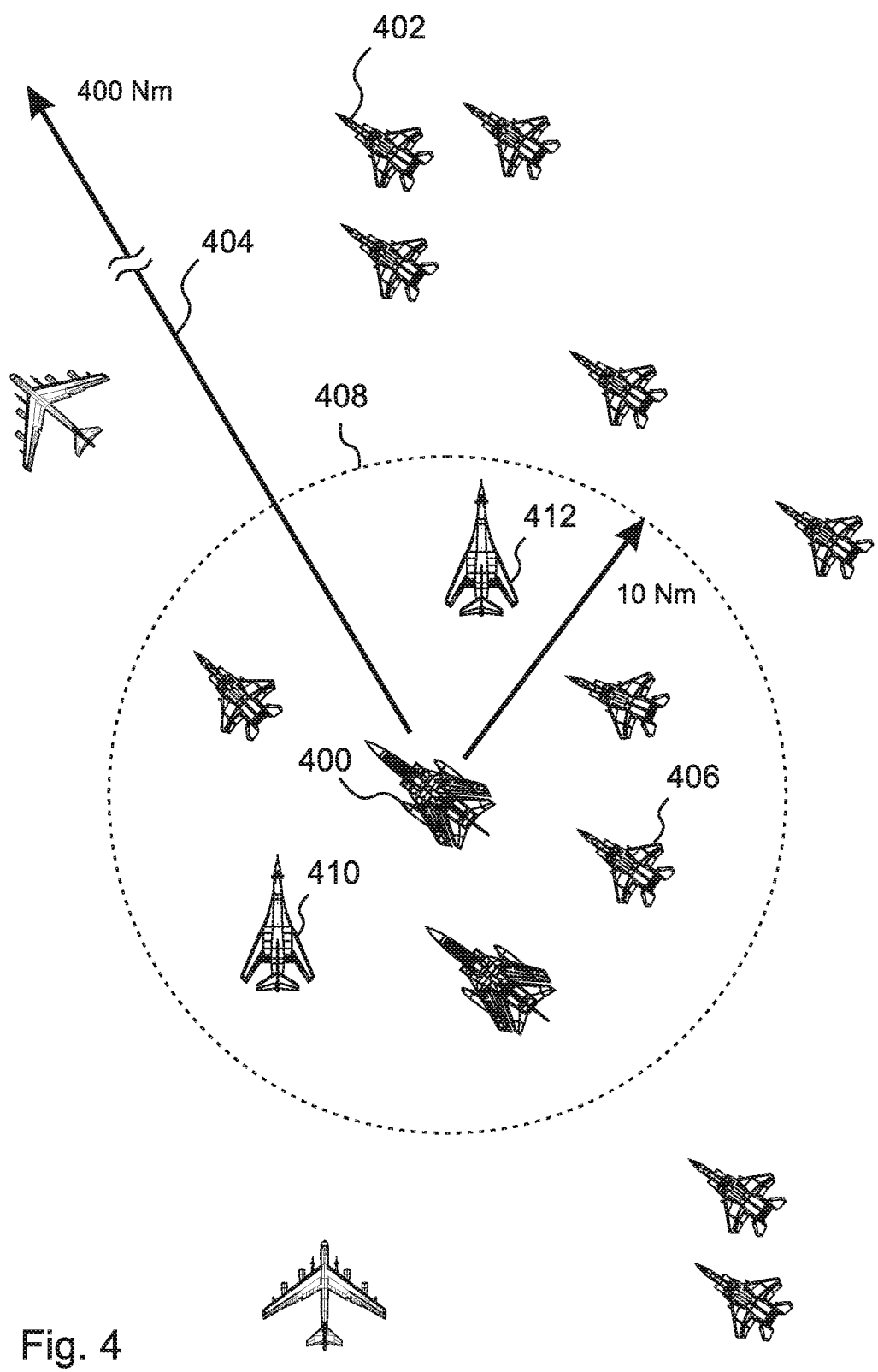
FIG. 4 is a graphical illustration of an embodiment of the present illustration implemented to avoid collisions between friendly, military aircraft.

The transmit power for Link 16 radios is typically 200 Watts, and with reference to FIG. 4, Link 16 requires support of communication between nodes 400, 402 that are separated by up to 400 Nm 404. Frequently, a Link 16 terminal, such as a JTRS-4 also includes a 1-watt transmitter that can be used to communicate with nearby nodes while reducing interference with more distant nodes. Unlike Link 16, however, the ICAS communication datalink requirement applies only to aircraft 406 that are located within 10 Nm 408 of each other.

Figure 5:
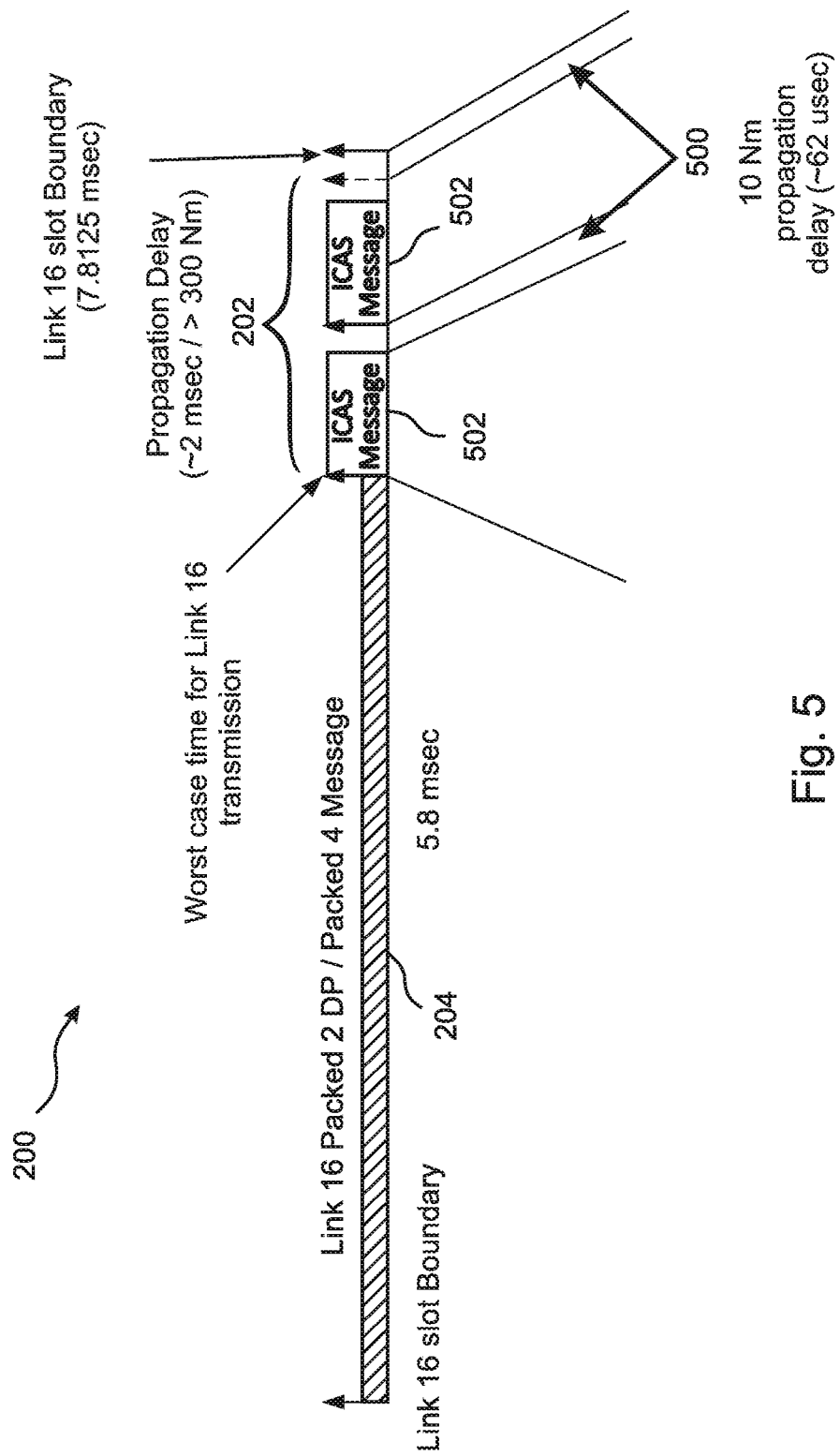
FIG. 5 is a graphical illustration of a modified Link 16 timeslot in an embodiment of the present disclosure in which two ICAS messages are transmitted during the Link 16 propagation delay segment of the timeslot.

With reference to FIG. 5, for aircraft 406 that are located within 10 Nm of each other, the propagation delay 500 is very small (about 62 usec.), such that most of the Link 16 timeslot propagation delay 202 serves no purpose. The present disclosure takes advantage of this fact, and makes use of the otherwise empty propagation delays 202 to contain the ICAS messages 502 that are exchanged between nearby aircraft over the ICAS datalink, while allowing the preceding 5.8 msec. 204 of the timeslot 200 to be used for conventional Link 16 communication. In embodiments, the ICAS messages 500 are each 768 bits long, and in some of these embodiments the messages include software level encryption.

As such, the collision avoidance data 502 of the present disclosure is synchronized with the timeslots 200 of the Link 16 network. In embodiments, the frequency hopping and/or data encoding of the collision avoidance messages 502 is/are also identical to or coordinated with the frequency hopping and/or data modulation scheme that is implemented in the Link 16 message payloads 204. However, it should be noted that embodiments incorporate frequency hopping patterns and/or data modulation schemes that deviate from, and can be largely unrelated to, the frequency hopping and data modulation scheme(s) that is/are implemented in the Link 16 message payloads 204.

In embodiments, as illustrated in FIG. 5, at least two 768-bit messages 502 can be exchanged within each 2 msec. propagation delay 202 of each link 16 timeslot 200. Since the Link 16 timeslots 200 are each about 7.8 msec. in length, this provides a total ICAS message rate of about 256 Hz, which satisfies the ICAS datalink specified requirement of exchanging messages with up to 10 nodes at a rate of 20 Hz per node, i.e. at total message rate of 200 Hz.

In embodiments, and with reference again to FIGS. 3 and 4, each of the participating aircraft 400 Link 16 transceivers 300 utilizes received Link 16 SDU-ID and PPLI information to determine which of the surrounding aircraft 402, 406, 410 are less than 10 Nm distant 408. In embodiments, as some aircraft 400, 410 draw nearer together while others 400, 412 diverge from each other, the nodes of the Link 16 network collaborate so as to dynamically assign transmission opportunities to the nodes, so as to allow them to join and withdraw from the collision avoidance data link(s), thereby enhancing collision avoidance. In some of these embodiments, these reassignments are implemented as an enhancement of the Link 16 timeslot reallocation functionality.

In some of these embodiments, the PPLI messages are further used to determine approximate closing rates for the nearby aircraft 406, 410, and in some of these embodiments the distance and closing rate information is used to prioritize the nearby aircraft 406, 410, so that the ICAS datalink module 304 is able to prioritize ICAS communication with the aircraft 410 that represent the greatest collision risks. In the case that more than 10 aircraft are located within 10 Nm of each other, this prioritization can be used to ensure that at any given time those aircraft 410 that pose the greatest threat of collision are included in the ICAS datalink.

The information that is determined by the ICAS datalink module 304 regarding nearby aircraft 410 that are "of interest" is then passed to the aircraft's central computer 306, in embodiments via 1553 MUX communication 308 at 25 Hz.

Figure 6:
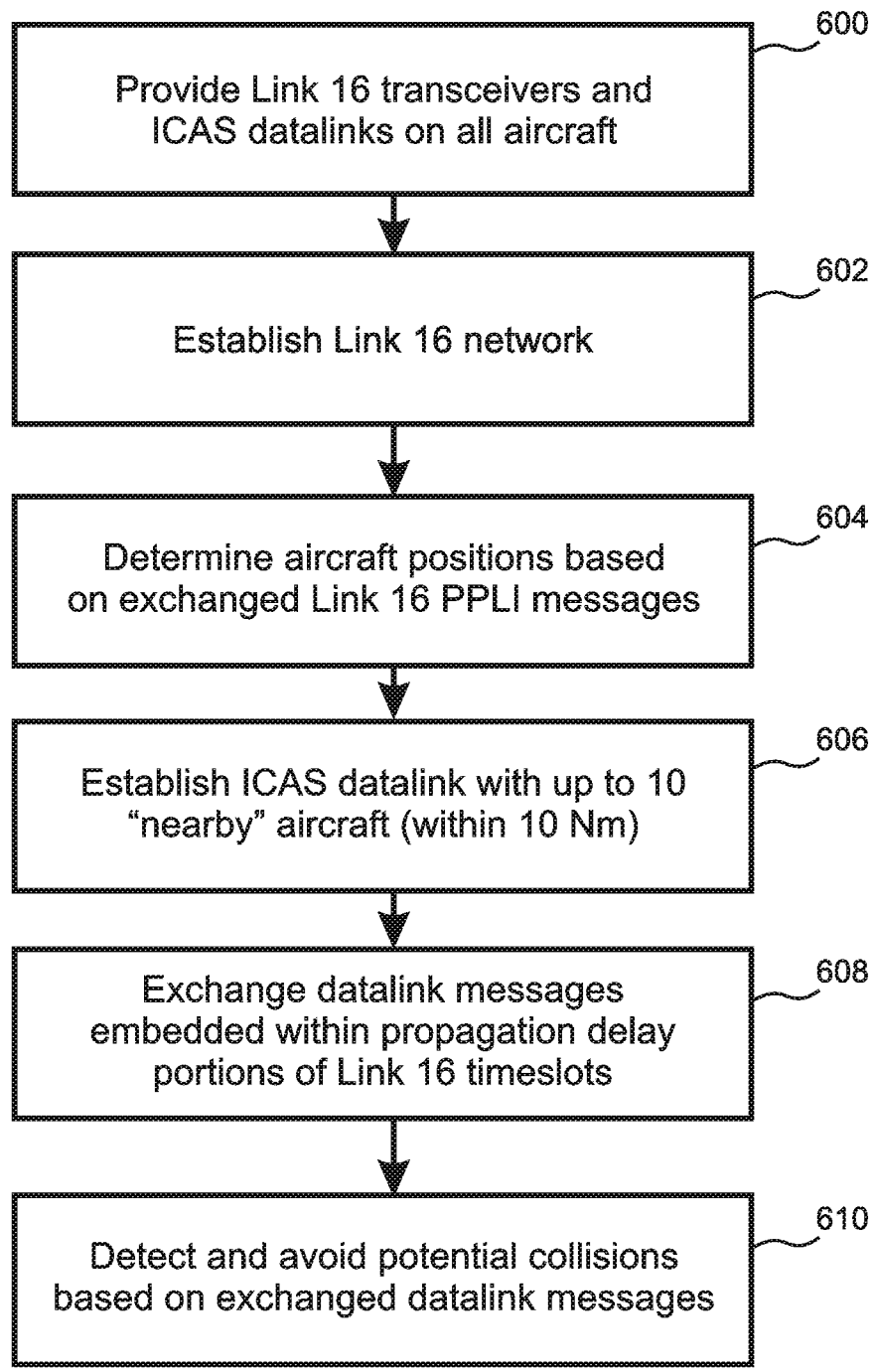
FIG. 6 is a flow diagram that summarizes an embodiment of the method of the present disclosure.

FIG. 6 is a flow diagram that summarizes an embodiment of the method of the present disclosure. The disclosed method requires that all of the participating nodes must be equipped 600 with Link 16 transceivers and ICAS datalink modules, wherein a modified Link 16 protocol is implemented on the Link 16 transceivers so as to enable them to carry out the disclosed method. A Link 16 network is established 602 that includes all of the participating aircraft, and based at least in part on exchanged Link16 PPLI messages, each of the aircraft determines the relative positions of all of the other aircraft 604. Each of the aircraft then establishes an ICAS datalink that includes up to 10 of the nearby aircraft 606, and exchanges datalink messages within the ICAS datalink by embedding the datalink messages within the propagation portions of Link 16 timeslots 608, thereby allowing the datalink messages to be transmitted and received by the Link 16 transceivers within Link 16 timeslots that also contain Link 16 message payloads 204. The aircraft are then able to detect potential collisions based at least in part on the exchanged datalink messages, and thereby avoid the collisions 610.

In embodiments, the present disclosure is implemented on a Link 16 "joint tactical radio system" terminal 300, or "MIDS-JTRS CMN4," which can be a four-channel JTRS, or "JTRS-4" transmitting and receiving using a "blade" antenna 302. In some embodiments, a lower transmitting power such as the JTRS 1-Watt transmitting mode is used for transmitting ICAS datalink messages.

Embodiments further implement a link 16 "pulse coding scheme that takes further advantage of the close proximity of the nodes that participate in the ICAS data link. In some of these embodiments, the LET coding scheme includes fewer preamble pulses in each Link 16 message as compared to the number specified by the current Link 16 standard. Embodiments further omit the 15-bit STN information from the timeslots, but continue to include SDU ID information in the timeslots so as to ensure that the Link 16 information assurance is maintained for the ICAS datalink messages.

And in some embodiments additional ICAS messages can be transmitted in dedicated timeslots, for example up to 7 ICAS messages per timeslot, so as to exceed the specified ICAS datalink specification and communicate with more than 10 nodes, and or to communicate at a data rate of more than 20 Hz per node.

While the present disclosure makes specific reference to Link 16 and to the auto ICAS standard for collision avoidance, it will be clear to those of skill in the art that the disclosed method of avoiding collisions is not limited to Link 16, nor to auto-ICAS, but is generally applicable to avoidance of collisions between aircraft that are linked by a timeslot-based (TDMA) communication network wherein the timeslots include propagation delay portions.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. A method of avoiding collisions between a protected aircraft and surrounding aircraft, the method comprising:
   providing on the protected aircraft and on each of the surrounding aircraft a Link 16 transceiver and a collision avoidance datalink module in data communication with the Link 16 transceiver;
   using the Link 16 transceivers to establish a Link 16 network that enables the protected aircraft to exchange Link 16 messages with all of the surrounding aircraft, the Link 16 messages being transmitted in Link 16 timeslots;
   determining by the protected aircraft of positions of the surrounding aircraft relative to the protected aircraft;
   designating as nearby aircraft all of the surrounding aircraft that are located within ten nautical miles of the protected aircraft;
   establishing a collision avoidance datalink between the protected aircraft and at least one of the nearby aircraft;
   exchanging datalink messages over the collision avoidance datalink, the datalink messages being generated and processed by the collision avoidance datalink modules, and being transmitted and received by the Link 16 transceivers; and
   detecting and avoiding potential collision threats at least partly based on the exchanged datalink messages;
   wherein the Link 16 transceivers transmit and receive the datalink messages by transmitting the datalink messages during propagation delay portions of the Link 16 timeslots that would otherwise be reserved for propagation delays of the Link 16 messages transmitted during the Link 16 timeslots, such that each Link 16 timeslot that contains a datalink message embedded in the propagation delay portion thereof is also able to contain a Link 16 message.

2. The method of claim 1, wherein the protected aircraft determines the positions of the surrounding aircraft at least partly based on Precise Participant Location and Identification ("PPLI") information received from the surrounding aircraft over the Link 16 network.

3. The method of claim 1, wherein the collision avoidance datalink is able to include at least ten nearby aircraft.

4. The method of claim 1, wherein at least two datalink messages can be embedded within the propagation delay portion of the Link 16 timeslots.

5. The method of claim 1, wherein the Link 16 transceivers are able to exchange embedded datalink messages at a rate of at least 200 Hz, thereby enabling the protected aircraft to exchange datalink messages with ten nearby aircraft over the collision avoidance datalink at a rate of 20 Hz per nearby aircraft.

6. The method of claim 1, wherein the datalink messages are each at least 768 bits in length.

7. The method of to claim 1, wherein Link 16 timeslots in which the datalink messages are embedded are transmitted by the Link 16 transceivers at a power level of no more than 1 Watt.

8. The method of claim 1, further comprising prioritizing by the Link 16 transceiver of the protected aircraft of the nearby aircraft at least partly according to relative distances of the nearby aircraft from the protected aircraft.

9. The method of claim 8, wherein the prioritizing of the nearby aircraft is further according to estimated rates at which the nearby aircraft are closing in position with the protected aircraft.

10. The method of claim 8, wherein if there are more than ten nearby aircraft, the collision avoidance datalink is established between the protected aircraft and those ten of the nearby aircraft having highest priorities.

11. The method of claim 1, further comprising the protected aircraft and the surrounding aircraft collaborating via the Link 16 network so as to assign data link message transmission opportunities to the surrounding aircraft, thereby enabling the surrounding aircraft to join and withdraw from the collision avoidance data link as their positions change with time.

12. The method of claim 1, wherein for Link 16 timeslots containing both a Link 16 message and a datalink message, the Link 16 message is encoded using a modified, enhanced throughput Link 16 protocol that includes fewer preamble pulses than are included in Link 16 messages transmitted in timeslots that do not include a datalink message.

13. The method of claim 12, wherein Source Track Number ("STN") information is not included in the Link 16 messages that are encoded using the modified, enhanced throughput Link 16 protocol.

14. The method of claim 1, wherein the datalink messages include software level encryption.

15. The method of claim 1, further comprising transmitting additional datalink messages in Link 16 timeslots that do not include Link 16 messages, but instead are filled with datalink messages, thereby increasing a rate of datalink message exchange over the collision avoidance datalink.

16. The method of claim 15, wherein each of the Link 16 timeslots that are filled with datalink messages is able to contain at least seven datalink messages.

17. A collision avoidance system that enables a protected aircraft to avoid collisions with surrounding aircraft, wherein each of the surrounding aircraft is carrying and operating compatible apparatus, the system comprising:
a Link 16 transceiver; and
a collision avoidance datalink module in data communication with the Link 16 transceiver;
the Link 16 transceiver being able to exchange Link 16 messages with the surrounding aircraft, thereby establishing a Link 16 network with all of the surrounding aircraft, the Link 16 messages being contained in Link 16 timeslots;
the Link 16 transceiver being able to determine positions of the surrounding aircraft relative to the protected aircraft based on the exchanged Link 16 messages, whereby all surrounding aircraft that are located within ten nautical miles of the protected aircraft are designated as nearby aircraft;
the link 16 transceiver and ICAS datalink being able to establish a collision avoidance datalink that includes the protected aircraft and at least one of the nearby aircraft, whereby the protected aircraft is able to exchange datalink messages with the at least one nearby aircraft over the collision avoidance datalink, the datalink messages being generated and processed by the collision avoidance datalink module and being transmitted and received by the Link 16 transceiver; and
the collision avoidance datalink module being able to detect and avoid potential collision threats, at least partly based on the exchanged datalink messages;
wherein the Link 16 transceiver is able to transmit and receive the datalink messages during propagation delay portions of the Link 16 timeslots that would otherwise be reserved for propagation delays of the Link 16 messages contained within the Link 16 timeslots, such that each Link 16 timeslot that contains a datalink message embedded in the propagation delay portion thereof is also able to contain a Link 16 message.

18. The system of claim 17, wherein at least two 768 bit datalink messages can be embedded within the propagation delay portion of the Link 16 timeslots.

19. The system of claim 17, wherein the Link 16 transceiver includes a one Watt transmitter that is able to transmit the datalink messages to the nearby aircraft.

20. The system of claim 17, wherein the Link 16 transceiver is further configured to:
prioritize the nearby aircraft according to their relative distances from the protected aircraft and their estimated closing rates with the protected aircraft; and
if there are more than ten nearby aircraft, establish the datalink between the protected aircraft and those ten of the nearby aircraft having highest priorities.

21. The system of claim 17, wherein the Link 16 transceiver is configured to encode Link 16 messages that are transmitted during timeslots that also include a datalink message using a modified, enhanced throughput Link 16 protocol that includes fewer preamble pulses than are included in conventional Link 16 messages, and does not include Source Track Number ("STN") information.

* * * * *